(12) United States Patent
Son et al.

(10) Patent No.: US 9,484,579 B2
(45) Date of Patent: Nov. 1, 2016

(54) BINDER COMPOSITION FOR RECHARGEABLE BATTERY AND RECHARGEABLE LITHIUM BATTERY HAVING THE SAME

(71) Applicant: SAMSUNG SDI CO., LTD., Yongin-si, Gyeonggi-do (KR)

(72) Inventors: Dongho Son, Yongin-si (KR); Kijun Kim, Yongin-si (KR); Junkyu Cha, Yongin-si (KR); Nari Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 136 days.

(21) Appl. No.: 14/149,771

(22) Filed: Jan. 7, 2014

(65) Prior Publication Data

US 2014/0272574 A1    Sep. 18, 2014

(30) Foreign Application Priority Data

Mar. 13, 2013  (KR) .................. 10-2013-0026878

(51) Int. Cl.
*H01M 4/13* (2010.01)
*H01M 4/62* (2006.01)
*H01M 4/134* (2010.01)

(52) U.S. Cl.
CPC ............ *H01M 4/622* (2013.01); *H01M 4/134* (2013.01)

(58) Field of Classification Search
CPC .................................... H01M 4/622
USPC ......................................... 429/217
See application file for complete search history.

(56) References Cited

U.S. PATENT DOCUMENTS

| | | | |
|---|---|---|---|
| 2009/0136846 A1* | 5/2009 | Lee et al. | 429/217 |
| 2013/0252066 A1* | 9/2013 | Yeou | H01M 2/166 429/144 |

FOREIGN PATENT DOCUMENTS

| | | | |
|---|---|---|---|
| KR | 10-2005-0038899 A | | 4/2005 |
| KR | 10-2007-0023141 A | | 2/2007 |
| KR | 20070023141 | * | 2/2007 |
| KR | 10-2008-0034219 | | 4/2008 |
| KR | 10-2009-0055305 | | 6/2009 |
| KR | 10-2010-0104510 A | | 9/2010 |
| KR | 10-2011-0054557 | | 5/2011 |

OTHER PUBLICATIONS

Translation of KR1020070023141, Feb. 28, 2007.*
KIPO Office Action dated Jul. 26, 2016, with English Translation, for corresponding Korean Patent Application No. 10-2013-0026878 (17 pages).

* cited by examiner

*Primary Examiner* — Hui Chin
(74) *Attorney, Agent, or Firm* — Lewis Roca Rothgerber Christie LLP (57) ABSTRACT

A binder composition for a rechargeable battery, including a binder polymer having a glass transition temperature (Tg) of 20° C. or less, and having a storage modulus (60° C.) of 50-150 MPa. The binder composition according to an embodiment can improve life characteristics of the rechargeable battery by efficiently controlling expansion of a negative electrode plate.

17 Claims, 1 Drawing Sheet

BINDER COMPOSITION FOR RECHARGEABLE BATTERY AND RECHARGEABLE LITHIUM BATTERY HAVING THE SAME

CROSS-REFERENCE TO RELATED APPLICATION

This application claims priority to and the benefit of Korean Patent Application No. 10-2013-0026878, filed on Mar. 13, 2013, the entire content of which is incorporated herein by reference.

BACKGROUND

1. Field

Embodiments of the present invention relate to a binder composition for a rechargeable battery and a rechargeable battery having the same.

2. Description of the Related Art

Lithium batteries having high voltage and high energy density are used in a wide variety of applications. For example, lithium batteries can be used to power electric vehicles. Here, since the electric vehicles, such as hybrid electric vehicles (HEV) or plug-in hybrid electric vehicles (PHEVs), are usually driven at high temperature, are charged or discharged with a large amount of electricity, and are used for an extended period of time, the lithium batteries having excellent discharge capacity and lifetime characteristics are desired.

A carbon-based material is a porous material and is stable due to a little volumetric change during charge and discharge. However, the carbon-based material generally has a low capacity due to a porous carbon structure. For example, a theoretic capacity of graphite having high crystallinity is 372 mAh/g in a $LiC_6$.

As the negative electrode active material having higher electric capacity than the carbon-based material, a metal alloyable with lithium can be used. For example, the metal alloyable with lithium may include Si, Sn, Al, etc. However, since the metal alloyable with lithium is prone to deteriorate, it has poor lifetime characteristics. For example, as charge and discharge cycles are repeated, aggregation and pulverization of Sn particles are repeated, thereby making the Sn particles electrically disconnected.

As the binder for a lithium battery capable of suppressing expansion of an electrode, polyimide, polyamideimide, etc. have been proposed. In a case of a lithium polymer battery requiring rolling and pressing of the electrode to cure the electrode, the electrode is prone to cracks, making it difficult to achieve commercialization.

As the binder for a lithium battery, a diene-based copolymer may also be used in a negative electrode. The diene-based copolymer binder has high flexibility but low strength when it is immersed in an electrolytic solution. Therefore, when a non-carbon based high capacity negative electrode active material, such as Si or Sn, which is capable of forming an alloy with lithium, is used, it is difficult to suppress expansion of the electrode.

In addition, the diene-based copolymer binder is prepared by polymerization methods, including emulsion polymerization, suspension polymerization, and so on. For example, processes for making a 2-phase (core/shell) particle structure in emulsion polymerization or continuously converting polymer composition by power-feed polymerization have been introduced. However, the polymer binder having the core/shell particle structure or the continuously converted polymer composition is disadvantageous in that flexibility and balanced strength after it is immersed in an electrolytic solution is difficult to achieve.

To solve the disadvantages stated above, there has been a demand for materials of a negative electrode, including a negative electrode active material, a binder, and so on, which has excellent storage modulus to control a high shrinkage-expansion ratio of the negative electrode active material. In particular, there are continuing research efforts to develop a binder capable of preventing electrode deformation due to expansion of the negative electrode active material by improving adhesion between the negative electrode active material and a current collector. To overcome limits of the comparable technology, it is desired to develop a binder having a sufficiently high storage modulus to improve lifetime characteristics of a lithium battery by coping with and/or suppressing a volumetric change of the non-carbon-based negative electrode active material.

SUMMARY

Aspects of embodiments of the present invention are directed toward a binder composition for a rechargeable battery, which demonstrates good lifetime characteristics of the rechargeable battery by controlling a high shrinkage-expansion ratio of a negative electrode active material during charging/discharging while providing a high capacity battery, and a lithium rechargeable battery having the binder composition.

According to an embodiment of the present invention, a rechargeable battery binder composition is provided, the rechargeable battery composition including a binder polymer having a glass transition temperature (Tg) of 20° C. or less, and having a storage modulus (60° C.) of 50-150 MPa.

According to another embodiment of the present invention, an electrode for a rechargeable battery is provided, including the binder composition according to an embodiment of the present invention.

According to still another embodiment of the present invention, a rechargeable battery is provided, including the electrode according to an embodiment of the present invention.

As described above, since the electrode prepared using the binder composition for a rechargeable battery according to an embodiment of the present invention provides an expansion preventing effect during repeated cycles of charging and discharging, a battery life retention rate is improved.

In addition, the binder composition for a rechargeable battery according to an embodiment of the present invention can efficiently control a shrinkage-expansion ratio of an electrode active material by adjusting the storage modulus of the electrode active material, thereby improving adherence between a current collector and the electrode active material and structural stability of the electrode.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawing, in which.

DETAILED DESCRIPTION

Hereinafter, embodiments of the present invention will be described in more detail with reference to the accompanying drawings. In the following detailed description, embodiments of the invention have been shown and described simply by way of illustration. However, the following are exemplary embodiments and are not limiting, and it will be appreciated by those skilled in the art that changes may be made in these embodiments without departing from the principles and spirit of the invention.

Binder Composition

According to an embodiment of the present invention, a lithium rechargeable battery having improved characteristics is provided. During charging and discharging of the lithium rechargeable battery, expansion of a negative electrode is suppressed, thereby providing a binder composition for a rechargeable battery, which can improve lifetime characteristics of the battery. Also, a shrinkage-expansion ratio of a high-capacity negative electrode active material, such as a Si- or Sn-based negative electrode active material, may be controlled.

In more detail, the Si- or Sn-based negative electrode active material can realize high capacity, but may cause several disadvantages, including capacity reduction, lifetime deterioration, etc. due to volumetric expansion during charging and discharging.

To overcome the disadvantages, an embodiment of the present invention provides a binder composition for a rechargeable battery, which can control a shrinkage-expansion ratio of a high-capacity negative electrode active material, such as a Si- or Sn-based negative electrode active material.

According to an embodiment of the present invention, the binder composition has a storage modulus (60° C.) of 50-150 MPa, and, in one embodiment, 60-120 MPa. In one or more embodiments, when the storage modulus of the binder composition is within the range stated herein, electrode expansion can be efficiently suppressed, thereby improving battery performance. For example, during charging and discharging, expansion of a negative electrode active material, e.g., a Si-based negative electrode active material, is suppressed, thereby preventing battery capacity reduction and lifetime deterioration due to excessive volumetric expansion and shrinkage even after repeated charging and discharging cycles. However, in one embodiment, when the storage modulus of the binder composition deviates from the range stated herein, flexibility of the electrode is lowered, thereby causing delamination of an active material and cracks of the electrode during an electrode forming or rolling process.

According to an embodiment of the present invention, the binder composition may include a binder polymer having a glass transition temperature of 20° C. or less, and, in one embodiment, in a range of −20° C. to 20° C. In one embodiment of the present invention, if the glass transition temperature is within the range stated herein, binding of active materials or binding of an active material or an electrode current collector is facilitated, thereby improving battery performance.

According to an embodiment of the present invention, the binder polymer is added to impart flexibility to an electrode and to secure adherence between an active material and a current collector. The polymer material is not particularly limited as long as it has a glass transition temperature of 20° C. or less. For example, the binder polymer may include a water-dispersed functional group. The binder polymer may be prepared by various suitable methods, including emulsion polymerization, solution polymerization, and so on, but not limited thereto. In addition, reaction conditions used in this method can be appropriately adjusted by one skilled in the art.

Examples of the binder polymer may include one or more selected from the group consisting of styrene-butadiene rubber, acrylated styrene-butadiene rubber, acrylonitrile-butadiene-rubber, acrylonitrile-butadiene-styrene rubber, acryl rubber, butyl rubber, fluorine rubber, polytetrafluoroethylene, polyethylene, polypropylene, ethylenepropylene copolymer, polyethyleneoxide, polyvinylpyrrolidone, poly-epichlorohydrin, poly-phosphazene, polyacrylate, polyacrylonitrile, polystyrene, ethylenepropylene diene copolymer, polyvinylpyridine, chlorosulfonated polyethylene, latex, polyester resin, acryl resin, phenol resin, epoxy resin, polyvinylalcohol, carboxymethylcellulose, hydroxypropylmethylcellulose, hydroxypropylcellulose and diacetylcellulose, but not limited thereto. Any material that can be used in the related art can be used as the polymer binder.

The binder polymer may be an aqueous polymer binder or a nonaqueous polymer binder. In the context of an embodiment, the aqueous polymer binder refers to a water-dispersed polymer binder that can be easily dispersed or dissolved in water.

Examples of the monomer used for preparation of the binder polymer may include ethylenated unsaturated carboxylic alkyl esters, such as methylmethacrylate, butylmethacrylate, ethylmethacrylate, 2-ethyl hexylmethacrylate, isobornyl(meth)acrylate, or cyclohexyl(meth)acrylate; cyano-containing ethylenated unsaturated monomers, such as acrylonitrile, methacrylonitrile, α-chloroacrylonitrile, or α-cyanoethyl acrylonitrile; conjugated diene monomers such as 1,3-butadiene, isoprene, 2,3-dimethyl-1,3-butadiene, 2-ethyl-1,3-butadiene, 1,3-pentadiene, or chloroprene; ethylenated unsaturated carboxylic acids and salts thereof, such as acrylic acid, methacrylic acid, maleic acid, fumaric acid, or citraconic acid; aromatic vinyl monomers, such as styrene, alkylstyrene, or vinylnaphthalene; fluoroalkylvinylethers, such as fluoroethylvinylether; nonconjugated diene monomers, such as vinylpyridine; vinylbononene, dicyclopentadiene, or 1,4-hexadiene; α-olefins such as ethylene or propylene; ethylenated unsaturated amide monomers such as methacrylamide; and so on, but not limited. Any suitable monomers that are used in the related art can be used.

The binder polymer may be by various suitable methods, including emulsion polymerization, solution polymerization, and so on. In addition, reaction conditions used in this method can be appropriately adjusted by one skilled in the art.

A styrene-butadiene rubber based polymer is in one embodiment used as the binder polymer.

According to an embodiment of the present invention, since the binder composition further includes nano particles having an average particle diameter of 100 nm, it has a high strength. In addition, cycle characteristics of the binder composition for a lithium battery (including the binder) can be improved to cope with and/or suppress a volumetric change of the non-carbon-based negative electrode active material during charging and discharging, thereby improving lifetime characteristics of the lithium battery. That is to say, since the binder composition includes nano particles, an improved storage modulus (elastic modulus) can be maintained at a high temperature of 60° C. or higher.

In the binder for a rechargeable battery, the nano particles may have average particle size in a range of 1 nm to 100 nm. In an embodiment, the average particle diameter of the nano particles is in a range of 5 nm to 100 nm. In an embodiment, the average particle diameter of the nano particles is in a range of 10 nm to 100 nm. In an embodiment, the average particle diameter of the nano particles is in a range of 20 nm to 100 nm. In still another embodiment, the average particle diameter of the nano particles is in a range of 30 nm to 100 nm. In an embodiment, the average particle diameter of the nano particles is in a range of 30 nm to 80 nm. In an embodiment, the average particle diameter of the nano particles is in a range of 40 nm to 80 nm. In an embodiment, the average particle diameter of the nano particles is in a range of 50 nm to 80 nm. In an embodiment, the average particle diameter of the nano particles is in a range of 50 nm to 80 nm. In an embodiment, the average particle diameter of the nano particles is in a range of 60 nm to 80 nm. In one embodiment, if the average particle diameter of the nano particles exceeds 100 nm, the binder has a reduced strength. In another embodiment, if the average particle size is excessively small, it is not easy to prepare the binder, and/or a solid content is lowered, making it difficult to handle the binder.

Meanwhile, in the binder composition, if the nano particles have a glass transition temperature of 60° C. or higher, the binder composition has a further improved strength.

In one embodiment, the nano particles, having a glass transition temperature of 60° C. or higher, can be organic particles and/or inorganic particles.

When the nano particles are the organic particles, they are polymeric particles. The binder composition according to an embodiment of the present invention may further include two or more different polymeric particles.

According to an embodiment of the present invention, the organic particles are used as a silane coupling agent, and the silane coupling agent may include one or more selected from the group consisting of alkoxy, halogen, amino, vinyl, glycydoxy and hydroxyl groups.

When the nano particles are inorganic particles, examples of the inorganic particles may include, but not limited to, colloidal silica, α-alumina, γ-alumina, zirconium oxide, and/or magnesium fluoride. Here, any suitable inorganic particles that are used in the related art can be used.

According to an embodiment of the present invention, the inorganic particles are, according to one embodiment, in a colloidal state of pH 8 to 11, which is for minimizing or reducing a change in the water-dispersed system by introduction of the inorganic particles.

The inorganic particles or the organic particles may be contained in an amount of 10% to 50% based on the total amount of effective components (a binder polymer having a glass transition temperature (Tg) of 20° C. or less) of the binder composition (the binder composition having a storage modulus (60° C.) of 50-150 MPa).

The binder composition may further include a coupling agent. When the binder composition includes nano particles, the coupling agent may react with polar functional groups present in the nano particles and/or the binder polymer, forming covalent bonds. For example, the nano particles and the binder polymer may be more firmly bonded to each other by use of the coupling agent. In the binder for a rechargeable battery, the coupling agent may be present in the form of a reaction product of the nano particles and/or binder polymer. Any suitable coupling agent can be used as long as it is capable of reacting with reactive functional groups introduced to the nano particles and the binder polymer.

The coupling agent may include a polar functional group and a reactive functional group. In an embodiment, the coupling agent includes a carboxyl group and a reactive functional group. In an embodiment, the coupling agent includes a hydroxyl group and a reactive functional group. In an embodiment, the coupling agent includes an amine group and a reactive functional group. In an embodiment, the coupling agent includes water and a reactive functional group.

In an embodiment, the coupling agent is a carbodiimide-based compound. Examples of the coupling agent may include, but not limited to, N,N'-di-o-tolylcarbodiimide, N,N'-diphenylcarbodiimide, N,N'-dioctyldecylcarbodiimide, N,N'-di-2,6-diketylphenylcarbodiimide, N-tolyl-N'-cyclohexylcarbodiimide, N,N'-di-2,6-diisopropylphenylcarbodiimide, N,N'-di-2,6-di-tertiary-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, p-phenylene-bis-di-o-tolylcarbodiimide, p-phenylene-bisdicyclohexylcarbodiimide, hexamethylene-bisdicyclohexylcarbodiimide, ethylene-bisdiphenylcarbodiimide, benzene-2,4-diisocyanato-1,3,5-tris(1-methylethyl) homopolymer, 2,4-diisocyanato-1,3,5-tris(1-methylethyl) and 2,6-diisopropyl diisocyanate copolymers and combinations thereof. Any suitable material that is used in the related art can be used as the carbodiimide-based compound. In the binder, the carbodiimide-based compound may be present in the form of a reaction product of first nano particles and/or a first polymer binder. In an embodiment, diimide bonds of the carbodiimide-based compound react with polar functional groups on surfaces of the first nano particles and are present in the reaction product having newly formed covalent bonds.

In an embodiment, the coupling agent is a silane coupling agent.

In an embodiment, the silane coupling agent includes one or more selected from the group consisting of alkoxy, halogen, amino, vinyl, glycydoxy and hydroxyl groups.

In an embodiment, the silane coupling agent includes one or more selected from the group consisting of vinylalkylalkoxysilane, epoxyalkylalkoxysilane, mercaptoalkylalkoxysilane, vinylhalosilane and alkylacyloxysilane.

In an embodiment, the silane coupling agent includes, but not limited to, one selected from the group consisting of vinyltris(β-methoxyethoxy)silane, γ-methacryloxypropyltrimethoxysilane, γ-gylcydoxypropyltrimethoxysilane, β-(3,4-epoxycyclohexyl)ethyltrimethoxysilane, γ-gylcydoxypropylmethyldiethoxysilane, γ-aminopropyltriethoxysilane, γ-mercaptopropyltrimethoxysilane, γ-chloropropyltrimethoxysilane, vinyltrichlorosilane, and methyltriacetoxysilane. Any suitable material that is used in the related art can be used as the silane coupling agent.

In an exemplary embodiment, a hydrazine compound, an isocyanate compound, a melamine compound, a urea compound, an epoxy compound, a carbodiimide compound, or an oxazoline compound is used as the silane coupling agent alone or in combination.

In particular and according to one embodiment, an oxazoline compound, a carbodiimide compound, an epoxy compound, or an isocyanate compound is used.

In addition and as another coupling agent, a self-crosslinkable monomer and/or a crosslinking agent having polyvalent coordinate sites may be used.

Here, a commercially available crosslinking agent may be used.

Specifically, APA series compounds, such as APA-M950, APA-M980, APA-P250, APA-P280, etc., which are commercially available from Otsuka Chemical Co (Japan), may be used as the hydrazine compound.

BASONAT PLR8878, BASONAT HW-100, etc., which are commercially available from BASF Aktiengesellschaft (Germany), Bayhydur 3100, Bayhydur VPLS 2150/1, etc., which are commercially available from Sumitomo Bayer Urethane Co., Ltd. (Japan), may be used as the isocyanate compound.

Simel 325, which is commercially available from Mitsui Scitec Corp. (Japan), may be used as the melamine compound.

Becamine series compound, which is commercially available from DIC Corporation, may be used as the urea compound.

Denakor series compounds, such as EM-150, EM-101, etc., which are commercially available from Nagase Chem Tech (Korea), adekaresin series compounds, such as EM-0517, EM-0526, EM-051R, or EM-11-50B, which are commercially available from ADEKA, may be used as the epoxy compound.

Carbodilite series compounds, such as SV-02, V-02, V-02-L2, V-04, E-01, E-02, V-01, V-03, V-07, V-09, or V-05, which are commercially available from Nisshinbo Chemical (Japan), may be used as the carbodiimide compound.

Epocros series compounds, such as WS-500, WS-700, K-1010E, K-1020E, K-1030E, K-2010E, K-2020E, or K-2030E, which are commercially available from Nippon Shokubai Co., Ltd. (Japan), may be used as the oxazoline compound.

The compounds listed above are manufactured and sold as dispersant materials or solutions including crosslinking agents.

In an embodiment, the coupling agent (that may or may not include the above self-crosslinkable monomer and/or a crosslinking agent) used in preparing the binder for a rechargeable battery is used in an amount of 10 wt % relative to the total weight to the reactant, based on the dry content. In an embodiment, the coupling agent used in preparing the binder for a rechargeable battery may be used in an amount of 5 wt % relative to the total weight to the reactant, based on the dry content. In an embodiment, the coupling agent used in preparing the binder for a rechargeable battery is used in an amount of 3 wt % relative to the total weight to the reactant, based on the dry content. In an embodiment, the coupling agent used in preparing the binder for a rechargeable battery is used in an amount of 0 to 3 wt % relative to the total weight to the reactant, based on the dry content.

A film breaking strength of the binder composition after being immersed in an electrolytic solution may be 30 kg/cm$^2$ or greater. In an embodiment, the binder for a rechargeable battery is immersed in a polar nonaqueous solvent at 70° C. for 72 hours, the solvent is wiped off, and the film breaking strength is then measured under the condition of a tensile speed of 100 cm/min. The measured film breaking strength of the binder may be 30 kg/cm$^2$ or greater. In an embodiment, after being immersed in an electrolytic solution, the binder for a rechargeable battery has a film breaking strength of 35 kg/cm$^2$ or greater. In an embodiment, after being immersed in an electrolytic solution, the binder for a rechargeable battery has a film breaking strength of 40 kg/cm$^2$ or greater. In an embodiment, after being immersed in an electrolytic solution, the binder for a rechargeable battery has a film breaking strength of 50 kg/cm$^2$ or greater. In an embodiment, after, being immersed in an electrolytic solution, the binder for a rechargeable battery has a film breaking strength of 60 kg/cm$^2$ or greater. In an embodiment, after being immersed in an electrolytic solution, the binder for a rechargeable battery has a film breaking strength of 70 kg/cm$^2$ or greater.

According to an embodiment of the present invention, the binder polymer is contained in an amount of 10 to 90% based on the total weight of the binder composition.

Rechargeable Battery

According to an embodiment of the present invention, the rechargeable battery is manufactured by a suitable method in the related art, using a negative electrode including the binder according to an embodiment of the present invention.

For example, the rechargeable battery may be manufactured by interposing a porous separator between a positive electrode and a negative electrode, and then injecting an electrolytic solution. The rechargeable battery may be a lithium ion rechargeable battery, a lithium polymer rechargeable battery, or a lithium ion polymer rechargeable battery.

In embodiments, the negative electrode includes a negative electrode active material and the binder according to an embodiment of the present invention.

The negative electrode may be formed by adding the binder composition for a rechargeable battery into an electrode active material slurry and removing a solvent from the slurry. In the course of forming the negative electrode, the binder for a rechargeable battery may be obtained from the binder composition.

The negative electrode may be formed to a set or predetermined shape from a negative electrode active material composition including, for example, a negative electrode active material and the binder composition. Alternatively, the negative electrode may be formed by coating the negative electrode active material composition on a current collector formed of, for example, a copper foil.

In more detail, a negative electrode active material composition is first prepared, the negative electrode active material composition including the negative electrode active material, a conductive material, the binder composition, and a solvent. The negative electrode plate is formed by directly coating the negative electrode active material composition on a metal current collector. Alternatively, the negative electrode plate may be formed by casting the negative electrode active material composition on a separate support, and laminating a film peeled off from the support on the metal current collector. The present invention does not limit the kind of the negative electrode to those listed above, and the negative electrode may be of a kind other than that stated above.

The negative electrode active material may be a non-carbon-based material. In an embodiment, the negative electrode active material includes one or more selected from the group consisting of metals alloyable with lithium, alloys of the metals alloyable with lithium, and oxides of the metals alloyable with lithium.

In an embodiment, the metals alloyable with lithium include Si, Sn, Al, Ge, Pb, Bi, Sb, Si—Y alloys (Y is an alkali metal, alkali earth metal, elements of 13 to 16 groups, transition metal, rare earth elements, and/or combinations thereof, other than Si.), Sn—Y alloys (Y is an alkali metal, alkali earth metal, elements of 13 to 16 groups, transition metal, rare earth elements, and combinations thereof, other than Sn.). Examples of the element Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

In an embodiment, the transition metal oxide may be lithium titan oxide, vanadium oxide, lithium vanadium oxide, or the like.

In an embodiment, the non-transition metal oxide may be a Si-based active material or an Sn-based active material.

In more detail, the negative electrode active material may include, but not limited to, one or more selected from the group consisting of Si, Sn, Pb, Ge, Al, $SiO_x$ ($0<x\leq2$), $SnO_y$ ($0<y\leq2$), $Li_4Ti_5O_{12}$, $TiO_2$, $LiTiO_3$, and $Li_2Ti_3O_7$. Any material that is generally used in the related art may be used as the non-carbon-based negative electrode active material.

Specifically, the Si-based active material may include one or more selected from the group consisting of silicon oxide or amorphous silicon; and alloys of silicon (Si) and one or more selected from Mg, Ca, Sr, Sn, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, In, Ti, Ge, P, As, Sb, Bi, S, Se and Te.

Specifically, the Sn-based active material may include one or more selected from the group consisting of tin (Sn) or tin oxide; and alloys of Sn and one or more selected from Mg, Ca, Sr, Si, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, In, Ti, Ge, P, As, Sb, Bi, S, Se and Te.

Alternatively, composites of the non-carbon-based negative electrode active material and the carbon-based material may also be used as the negative electrode active material. In addition to the non-carbon-based material, a carbon-based negative electrode active material may further be included in the negative electrode active material.

The carbon-based material may include crystalline carbon, amorphous carbon, or a mixture thereof. The crystalline carbon may be non-shaped, or sheet, flake, spherical, or fiber shaped natural or artificial graphite. The amorphous carbon may be a soft carbon (carbon obtained by sintering at a low temperature), a hard carbon (carbon obtained by sintering at a high temperature), mesophase pitch carbide, fired coke, and so on.

Examples of suitable conductive materials may include, but not limited to, natural graphite, artificial graphite, carbon black, acetylene black, ketjen black, carbon fiber, polyphenylene derivatives, and metal powders or metal fibers including copper, nickel, aluminum, silver, and so on. For the conductive material, any electrically conductive material may be used as long as it can be generally used in the related art. The crystalline carbon-based material may also be added as the conductive material.

In addition to the binder for a rechargeable battery, the conventional binder that is generally used in the art may further be used. Examples of the conventional binder may include, but not limited to, vinylidene fluoride/hexafluoropropylene copolymer, polyvinylidenefluoride (PVDF), polyacrylonitrile, polymethylmethacrylate, polytetrafluoroethylene and mixtures thereof, or styrene butadiene rubber-based polymer. However, any suitable material that is generally used as the coupling agent may be used.

N-methylpyrrolidone, acetone or water may be used as the solvent, but not limited thereto. Any suitable material that is generally used in the related art may be used.

Amounts of the negative electrode active material, the conductive material, the general binder and the solvent may be used at the same levels as used in a general lithium battery. According to a purpose or structure of a lithium battery, at least one selected from the group consisting of the conductive material, the general binder and the solvent may not be used herein.

In alternative embodiment, the lithium battery employs the negative electrode. The lithium battery may be manufactured in the following manner.

First, a negative electrode is prepared by the method according to one embodiment of the present invention as described above.

Next, a positive electrode active material composition is prepared, the positive electrode active material composition including a positive electrode active material, a conductive material, a binder and a solvent. Then, a positive electrode is formed by directly coating the positive electrode active material composition on a metal current collector, drying the resultant product. Alternatively, the positive electrode may also be formed by casting the positive electrode active material composition on a separate support, and laminating a film peeled off from the support on the metal current collector.

Examples of the positive electrode active material may include, but not limited to, one or more selected from the group consisting of lithium cobalt oxide, lithium nickel cobalt manganese oxide, lithium nickel cobalt aluminum oxide, lithium iron phosphor oxide, and lithium manganese oxide. Any positive electrode active material that is generally used in the related art may be used.

In an embodiment, the positive electrode active material may include a compound represented by one of $Li_aA_{1-b}B_bD_2$, where $0.90\leq a\leq1.8$, and $0\leq b\leq0.5$; $Li_aE_{1-b}B_bO_{2-c}D_c$, where $0.90\leq a\leq1.8$, $0\leq b\leq0.5$, and $0\leq c\leq0.05$; $LiE_{2-b}B_bO_{4-c}D_c$, where $0\leq b\leq0.5$, and $0\leq c\leq0.05$; $Li_aNi_{1-b-c}Co_bB_cD_\alpha$, where $0.90\leq a\leq1.8$, $0\leq b\leq0.5$, $0\leq c\leq0.05$, and $0<\alpha<2$; $Li_aNi_{1-b-c}Co_bB_cO_{2-\alpha}F_\alpha$, where $0.90\leq a\leq1.8$, $0\leq b\leq0.5$, $0\leq c\leq0.05$, and $0<\alpha<2$; $Li_aNi_{1-b-c}Co_bB_cO_{2-\alpha}F_2$, where $0.90\leq a\leq1.8$, $0\leq b\leq0.5$, $0\leq c\leq0.05$, and $0<\alpha<2$; $Li_aNi_{1-b-c}Mn_bB_cD_\alpha$, where $0.90\leq a\leq1.8$, $0\leq b\leq0.5$, $0\leq C\leq0.05$, and $0<\alpha<2$; $Li_aNi_{1-b-c}Mn_bB_cO_{2-\alpha}F_\alpha$, where $0.90\leq a\leq1.8$, $0\leq b\leq0.5$, $0\leq c\leq0.05$, and $0<\alpha<2$; $Li_aNi_{1-b-c}Mn_bB_cO_{2-\alpha}F_2$, where $0.90\leq a\leq1.8$, $0\leq b\leq0.5$, $0\leq c\leq0.05$, and $0<\alpha<2$; $Li_aNi_bE_cG_dO_2$, where $0.90\leq a\leq1.8$, $0\leq b\leq0.9$, $0\leq c\leq0.5$, and $0.001\leq d\leq0.1$; $Li_aNi_bCo_cMn_dGeO_2$, where $0.90\leq a\leq1.8$, $0\leq b\leq0.9$, $0\leq c\leq0.5$, $0\leq d\leq0.5$, and $0.001\leq e\leq0.1$; $Li_aNiG_bO_2$, where $0.90\leq a\leq1.8$, and $0.001\leq b\leq0.1$; $Li_aCoG_bO_2$, where $0.90\leq a\leq1.8$, and $0.001\leq b\leq0.1$; $Li_aMnG_bO_2$, where $0.90\leq a\leq1.8$, and $0.001\leq b\leq0.1$; $Li_aMn_2G_bO_4$, where $0.90\leq a\leq1.8$, and $0.001\leq b\leq0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3 (0\leq f\leq2)$; $Li_{(3-f)}Fe_2(PO_4)_3 (0\leq f\leq2)$; and $LiFePO_4$.

In the above chemical formulas, A is selected from Ni, Co, Mn, and combinations thereof; B is selected from Al, Ni, Co, Mn, Cr, Fe, Mg, Sr, V, a rare earth element and combinations thereof; D is selected from O, F, S, P, and combinations thereof; E is selected from Co, Mn, and combinations thereof; F is selected from F, S, P, and combinations thereof; G is selected from Al, Cr, Mn, Fe, Mg, La, Ce, Sr, V, and combinations thereof; Q is selected from Ti, Mo, Mn, and combinations thereof; I is selected from Cr, V, Fe, Sc, Y, and combinations thereof; and J is selected from V, Cr, Mn, Co, Ni, Cu, and combinations thereof.

The compound used herein may have a coating layer formed on its surface. Alternatively, a mixture of the compound and the compound have a coating layer may also be used as the positive electrode active material. The coating layer may include oxide, hydroxide, oxyhydroxide, oxycarbonate and hydroxycarbonate of the elements included in the coating layer. The compound forming the coating layer may be amorphous or crystalline. Examples of the elements coated on the coating layer may include Mg, Al, Co, K, Na, Ca, Si, Ti, V, Sn, Ge, Ga, B, As, Zr, and/or mixtures thereof. The coating layer may be formed by any coating method that is used in the related art, for example, spray coating or dipping, so long as physical properties of the positive electrode active material are not adversely affected by the coating method, which is well understood by one skilled in the art and a detailed description thereof will not give given.

In an embodiment, $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0≦x=0.5, and 0≦y=0.5), $LiFeO_2$, $V_2O_5$, TiS, or MoS, may be used for the coating layer.

The conductive material, the binder and the solvent used for the positive electrode active material composition may be the same as those used for the negative electrode active material composition. Meanwhile, a plasticizer may further be added to the positive electrode active material composition and/or the negative electrode active material composition, thereby providing porosity to the electrode plate.

Amounts of the positive electrode active material, the conductive material, the general binder and the solvent may be used at the same levels as used in a general lithium battery. According to a purpose or structure of a lithium battery, at least one selected from the group consisting of the conductive material, the general binder and the solvent may not be used herein.

Then, a separator that is to be interposed between the cathode and the anode is prepared. The separator may be any one of various separators suitably used in a lithium battery. The separator may have a low resistance to ion flow and a high electrolytic solution-retaining capability. In an embodiment, the separator includes at least one selected from glass fiber, polyester, Teflon, polyethylene, polypropylene, polytetrafluoroethylene (PTFE) and combinations thereof and may be in the form of nonwoven or woven fabric. In embodiments, a separator suitable for a lithium ion battery is a rollable separator including, for example, polyethylene or polypropylene, and a separator suitable for a lithium ion polymer battery is a separator that has an excellent organic electrolytic solution-retaining capability. An example of a method of forming the separator will now be described in more detail.

A polymer resin, a filler, and a solvent are mixed to prepare a separator composition. The separator composition may be directly coated on an electrode and dried to form a separator. Alternatively, the separator composition may be cast on a support, dried, and then separated from the support as a separator film and then the separator film may be laminated on an electrode, thereby forming the separator.

The polymer resin used in forming the separator may not be particularly limited and may be any one of various materials that are used as a binder of an electrode plate in the art. Examples of the polymer are a vinylidenefluoride/hexafluoropropylene copolymer, polyvinylidenefluoride (PVDF), polyacrylonitrile, polymethylmetacrylate, and a mixture thereof.

Next, an electrolyte is prepared.

In an embodiment, the electrolyte may be an organic electrolytic solution. In addition, the electrolyte may be solid. In an embodiment, the electrolyte may be boron oxide, lithium oxynitride, but not limited thereto. The solid electrolyte may be any one of various suitable solid electrolytes used in the art. The solid electrolyte may be formed on the anode by, for example, sputtering.

In an embodiment, an organic electrolytic solution is prepared. The organic electrolytic solution may be prepared by dissolving a lithium salt in an organic solvent.

Any organic solvent that is used in the related art can be used as the organic solvent. In an embodiment, the organic solvent includes at least one selected from the group consisting of propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahydrofuran, γ-butyrolactone, dioxolane, 4-methyl dioxolane, N,N-dimethylformamide, dimethylacetamide, dimethylsulfoxide, dioxane, 1,2-dimethoxyethane, sulforane, dichloroethane, chlorobenzene, nitrobenzene, diethyleneglycol, dimethylether, and mixtures thereof.

Any lithium salt that is used in the related art can be used as the lithium salt. In an embodiment, the lithium salt includes at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, where x and y are natural numbers, LiCl, LiI, and mixtures thereof.

Figure 1:
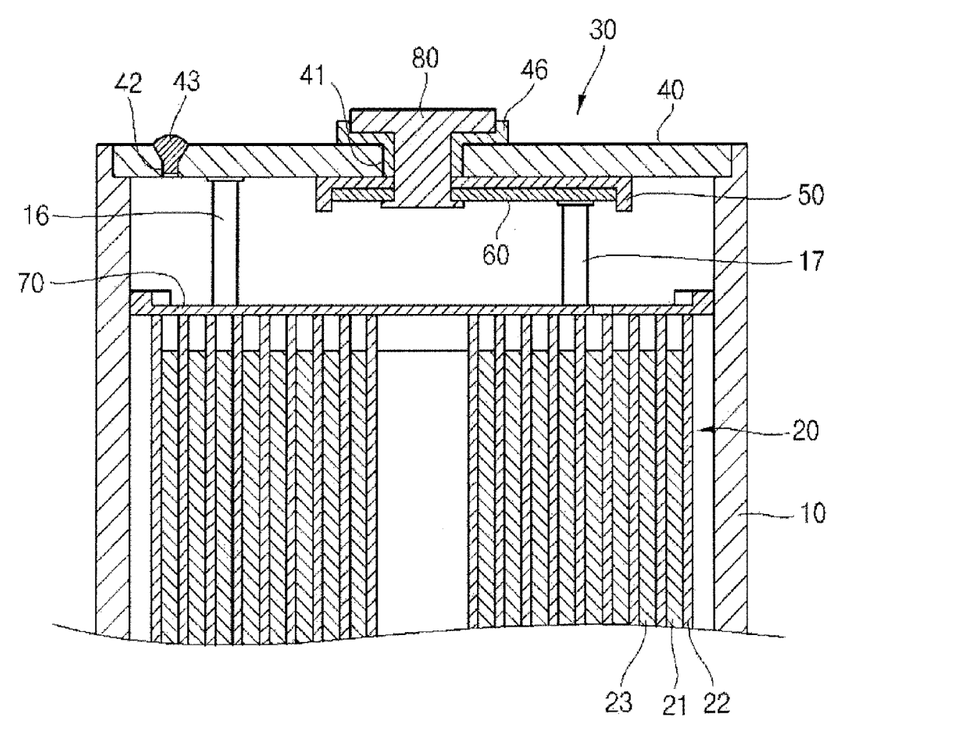
The drawing is a cross-sectional view schematically illustrating a rechargeable battery according to an embodiment of the present invention.

As shown in the drawing, the lithium battery 1 includes a positive electrode 3, a negative electrode 2 and a separator 4. The positive electrode 3, the negative electrode 2 and the separator 4 are wound or folded to then be housed in a battery case 5. Next, an organic electrolytic solution is injected into the battery case 5 and sealed with a cap assembly 6, thereby completing the lithium battery 1. The battery case 5 may have a cylindrical shape, a prismatic shape, a thin film shape, etc. In an embodiment, the lithium battery is a thin film battery. In addition, the lithium battery may be a lithium ion battery.

The separator may be interposed between the positive electrode and the negative electrode to form an electrode assembly. The battery assembly may be stacked in a bi-cell structure and impregnated into the organic electrolytic solution, and the resultant product is housed in a pouch and sealed, thereby completing manufacturing of a lithium ion polymer battery.

Alternatively, a plurality of battery assemblies may be stacked one on another to form a battery pack, and the battery pack can be used in all high-capacity and high-performance devices, such as a notebook computer, a smart phone, an electric vehicle (EV), and so on.

In particular, since lithium batteries have enhanced high rate capacity characteristics and excellent lifetime characteristics, they are suitable for use in an EV. For example, the lithium battery may be used in a hybrid vehicle such as a plug-in hybrid electric vehicle (PHEV).

Now, the present invention will be described in more detail with reference to the following examples. These examples are provided only to illustrate the present invention and should not be construed as limiting the scope and spirit of the present invention.

EXAMPLE 1

A pressure resistant polymerization vessel equipped with a 10 L agitator was purged with nitrogen, 60 parts by weight of distilled water and 1.5 parts by weight of sodium dodecylbenzene sulfonic acid were added thereto, following by raising the temperature to 70° C. Next, a monomer emulsion composition was dropwise added to the reaction vessel for 4 hours, the monomer emulsion composition including 2 parts by weight of styrene was added to the reaction vessel and stirred for 5 minutes. Thereafter, including 2% aqueous solution of 10 parts by weight of potassium peroxy sulfate was added to the reaction vessel to initiate polymerization. After one hour, 33 parts by weight of butadiene, 53 parts by weight of styrene, 10 parts by weight of methylmethacrylate, 2.0 parts by weight of methacrylic acid (MAA), 1.0 part by weight of acrylic acid (AA), 1 part by weight of itaconic acid, 0.5 parts by weight of sodium dodecylbenzene sulfonic acid, and 40 parts by weight of water. At the same time, 2% aqueous solution of 10 parts by weight of potassium peroxy sulfate was dropwise added to the reaction vessel for 3 hours. After the dropwise addition of the monomer emulsion was completed, the reaction was allowed to continue for 3 hours, followed by cooling to 20° C., reducing the pressure to remove remaining monomer, thereby acquiring a copolymer emulsion.

5% sodium hydroxide was used to adjust a pH to be 7.5, and a solid content was adjusted to 40% to be used for evaluation.

EXAMPLES 2-6

A copolymer emulsion was acquired in the same manner as in Example 1, except that a monomer emulsion was prepared using a composition having ingredients listed in Table 1, instead of 33 parts by weight of butadiene, 53 parts by weight of styrene, 10 parts by weight of methylmethacrylate, 2.0 parts by weight of methacrylic acid (MAA), 1.0 part by weight of acrylic acid (AA), 1 part by weight of itaconic acid as in Example 1.

TABLE 1

(Unit: part(s) by weight)

| Composition | | 1 | 2 | 3 | 4 | 5 | 6 |
|---|---|---|---|---|---|---|---|
| Butadiene | | 33 | 37 | 42 | 48 | | |
| 2-ethylhexylacrylate | | | | | | 36.5 | 40.5 |
| Styrene | | 53 | 49 | 44 | 38 | | |
| Methylmethacrylate | | 10 | 10 | 10 | 10 | | |
| Acrylonitrile | | | | | | 15 | 15 |
| Isobonylacrylate | | | | | | 44 | 40 |
| Methacrylic acid | | 2 | 2 | 3 | 2 | 1 | 1 |
| Acrylic acid | | 1 | 1 | 1 | 1 | 1 | 1 |
| Itaconic acid | | 1 | 1 | 1 | 1 | | |
| Hydroxyethylacrylate | | | | | | 2 | 2 |
| Ethylenedimethacrylate | | | | | | 0.5 | 0.5 |
| Crosslinkable monomer | Glycidylmethacrylate | | | 3 | 1 | | |
| | N-methylolacrylamide | 1.5 | | | | | |
| Crosslinking agent | [1]CARBODILTE V02L2 | | 0.5 | | 1 | 1 | 1 |
| Composite particles | [2]Magnesium fluoride | | | | 30 | | |
| | [3]EPOSTAR MX030W | 30 | 20 | | | | 10 |
| | [4]SUPERFLEX130 | | | | | 30 | 20 |

[1]CARBODILITE V02L2: Nisshinbo Chemical - Crosslinking agent
[2]Magnesium fluoride: CIK Nano Tech - Inorganic polymer particles
[3]EPOSTAR MX030W: Nippon Shokubai Co., Ltd. - Acryl-based organic polymer particles
[4]SUPERFLEX130: Daiichi Pharmaceutical, Co., Ltd. - Urethane-based organic polymer particles

COMPARATIVE EXAMPLES 1-6

A copolymer emulsion was acquired in the same manner as in Example 1, except that a monomer emulsion was prepared using a composition having ingredients listed in Table 2, instead of 33 parts by weight of butadiene, 53 parts by weight of styrene, 10 parts by weight of methylmethacrylate, 2.0 parts by weight of methacrylic acid (MAA), 1.0 part by weight of acrylic acid (AA), and 1 part by weight of itaconic acid as in Example 1.

TABLE 2

(Unit: part(s) by weight)

| Composition | 1 | 2 | 3 | 4 | 5 | 6 |
|---|---|---|---|---|---|---|
| Butadiene | 29 | 29 | 50 | | 29 | 30 |
| 2-ethylhexylacrylate | | | | 30.5 | | |
| Styrene | 57 | 57 | 36 | | 57 | 54 |
| Methylmethacrylate | 10 | 10 | 10 | | 10 | 10 |
| Acrylonitrile | | | | 15 | | |

TABLE 2-continued (Unit: part(s) by weight)

| | Composition | Comparative Example | | | | | |
| --- | --- | --- | --- | --- | --- | --- | --- |
| | | 1 | 2 | 3 | 4 | 5 | 6 |
| | Isobonylacrylate | | | | 50 | | |
| | Methacrylic acid | 1.5 | 1.5 | 1.5 | 1 | 1.5 | 2 |
| | Acrylic acid | 1 | 1 | 1 | 1 | 1 | 1 |
| | Itaconic acid | 1.5 | 1.5 | 1.5 | | | |
| | Hydroxyethylacrylate | | | | 2 | | |
| | Ethylenedimethacrylate | | | | 0.5 | | |
| Crosslinkable monomer | Glycidylmethacrylate | | | | | | 3 |
| | N-methylolacrylamide | | | | | 1.5 | |
| Crosslinking agent | 1)CARBODILTE V02L2 | | | 1 | 1 | | |
| Composite particles | 2)Magnesium fluoride | | | | | | |
| | 3)EPOSTAR MX030W | | | | 30 | | |
| | 4)SUPERFLEX130 | | | | 10 | | |

EXPERIMENTAL EXAMPLE 1

Evaluation of Binder Characteristics (1) Sampling

Each of the copolymer binders prepared in Examples 1-6 and Comparative Examples 1-6 was cast on a planar glass and dried at room temperature for two days. Next, the resultant product was dried at 140° C. for 20 minutes, thereby acquiring a 6 mm thick polymer film.

(2) Storage Modulus

Each of the binder compositions for a rechargeable battery, prepared in Examples 1-6 and Comparative Examples 1-6, was coated on a substrate, dried at room temperature for 24 hours to remove a solvent and to peel off a film from the substrate, thereby preparing a binder sample.

The polymer binder film was cut to have a width of 0.8 cm and a length 3 cm to measure a storage modulus at 60° C. using DMA Q 800 produced by TA Instruments, Inc.

(3) Glass Transition Temperature (Tg)

The glass transition temperature (Tg) was measured based on tanδ values of modulus/temperature data obtained by a dynamic mechanical analyzer (DMA).

(4) Breaking Strength of Film Immersed in Electrolytic Solution

Each of the binder compositions for a rechargeable battery, prepared in Examples 1-6 and Comparative Examples 1-6, was poured into a petri dish made of Teflon and having a diameter of 12 cm, dried at room temperature for 2 days, thereby forming a 0.6 mm thick binder film. The binder film was dried with a vacuum dryer of 70° C. for 10 hours to sufficiently eliminate moisture. A binder sample having a length of 5 cm and a width of 5 mm was fabricated from the dried binder film.

The prepared binder sample was dipped into a mixed solvent (electrolyte solvent) having ethylenecarbonate (EC): ethylmethylcarbonate (EMC): diethylcarbonate (DEC) mixed in a volume ratio of 3:5:2 at 70° C. for 72 hours, the electrolyte solvent was wiped off, and the breaking strength of the film was then measured using a tension tester under the condition of a tensile speed of 100 cm/min.

Breaking strength of 4 binder film samples was obtained using the following relationship:

Sample strength=(breaking strength of sample having highest strength)×0.5+(breaking strength of sample having second highest strength)×0.3+(breaking strength of sample having third highest strength)×0.1+(breaking strength of sample having lowest strength)×0.1

EXPERIMENTAL EXAMPLE 2

Evaluation of Battery Characteristics (1) Manufacture of Battery 1 part by weight of each of the binder compositions for a rechargeable battery, prepared in Examples 1-6 and Comparative Examples 1-6, was mixed with 10 parts by weight of $SiO_x$ (0<x<2), 88 parts by weight of graphite, 1 part by weight of carboxymethyl cellulose (CMC) and 120 parts by weight of water to prepare a negative electrode slurry. The slurry was coated on a Cu base at a rate of 10 mg/cm$^2$, dried, and pressed to a density of 1.7 g/cc to fabricate an electrode, thereby manufacturing a coin cell (CR2016 type) having a diameter of 32 mm.

In the manufacture of the battery cell, metal lithium was used as a counter electrode, and a 20 μm thick polyethylene separator (Star®20) was used as a separator, an electrolytic solution obtained by dissolving 1.15M $LiPF_6$ in a mixed solvent having ethylenecarbonate (EC): ethylmethylcarbonate (EMC): diethylcarbonate (DEC) mixed in a volume ratio of 3:3:4 was used as an electrolyte.

In such a manner, the batteries according to Examples 1-6 and Comparative Examples 1-6 were manufactured.

(2) Capacity Retention Rate and Electrode Expansion Ratio

The coin cells manufactured according to Examples 1-6 and Comparative Examples 1-6 were charged with a constant current (CC) (0.7 C) at a constant voltage (CV) (0.02 C cut-off), and discharged with 0.5 C. After repeating the charge and discharge cycle 100 times, lifetime characteristics were calculated using the equation (1).

In addition, the electrode expansion ratio was calculated using the equation (2) as follows. That is, after a first CC/CV charge cycle was completed, the battery cell was broken down to measure a thickness of a negative electrode before it is assembled into the battery cell. In addition, after the 100 th charge and discharge cycles, the battery cell was broken down to measure a thickness of the negative electrode.

Capacity retention rate=[100$^{th}$ cycle discharge capacity/1$^{st}$ cycle discharge capacity]×100   <Equation 1>

Electrode expansion ratio [%]=[Thickness of negative electrode after 1$^{st}$ cycle charge/Thickness of unused negative electrode]×100   <Equation 2>

The evaluation results of the battery performance of the battery batteries according to Examples 1-6 and Comparative Examples 1-6 are shown in Tables 3 and 4.

TABLE 3

| Physical property | Example | | | | | |
|---|---|---|---|---|---|---|
| | 1 | 2 | 3 | 4 | 5 | 6 |
| Binder polymer Tg (° C.) | 10 | 1 | −8 | −19 | 17 | 9 |
| 60° C. storage elastic modulus (MPa) of binder composition | 100 | 120 | 90 | 55 | 65 | 70 |
| Breaking strength (Kg/cm$^2$) after immersion in electrolytic solution | 90 | 100 | 80 | 35 | 40 | 90 |
| Capacity retention rate (%, 100 cycles) | 82 | 83 | 80 | 80 | 75 | 78 |
| Electrode expansion ratio (%) | 35 | 37 | 36 | 48 | 43 | 39 |

TABLE 4

| Physical property | Comparative Example | | | | | |
|---|---|---|---|---|---|---|
| | 1 | 2 | 3 | 4 | 5 | 6 |
| Binder polymer Tg (° C.) | 18 | 28 | −22 | 31 | 19 | 16 |
| 60° C. storage elastic modulus (MPa) of binder composition | 10 | 15 | 5 | 5 | 5 | 6 |
| Breaking strength (Kg/cm$^2$) after immersion in electrolytic solution | 23 | 24 | 22 | 21 | 24 | 22 |
| Capacity retention rate (%, 100 cycles) | 65 | X (Electrode cracks) | 66 | X (Electrode cracks) | 63 | 62 |
| Electrode expansion ratio (%) | 58 | X | 55 | X | 62 | 68 |

As confirmed from Tables 3 and 4, the rechargeable batteries according to the present invention employed a binder composition in preparing a negative electrode having a storage modulus (60° C.) of 50 to 150 MPa, thereby suppressing expansion of the electrode while improving the capacity retention rate of battery. In particular, the binder prepared in Comparative Example 1, in which the binder composition includes a styrene-butadiene rubber based polymer that is generally known in the art, had a high expansion ratio and a low lifetime retention rate, compared to the binder according to the present invention.

In addition, as in Comparative Examples 1, 3 and 5-6, in which the glass transition temperature of the binder polymer used in the binder composition was 20° C. or less, if the storage modulus (60° C.) is less than 50 MPa, the electrode expansion ratio increases, so that the capacity retention rate may be lowered.

Accordingly, expansion of an electrode active material can be efficiently suppressed by employing the binder polymer according to an embodiment of the present invention in the negative electrode, thereby increasing the structural stability of the electrode. In addition, according to an embodiment of the present invention, lifetime deterioration of batteries can be prevented, thereby allowing the batteries to demonstrate excellent battery characteristics.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims, and equivalents thereof.

What is claimed is:

1. A rechargeable battery binder composition, comprising:
   one or more nanoparticles having an average particle diameter of 10 nm to 100 nm, and
   a binder polymer having a glass transition temperature (Tg) of 20° C. or less,
   wherein the rechargeable battery binder composition has a storage modulus (60° C.) of 50-150 MPa, and
   wherein the nanoparticles comprise organic particles utilized as a silane coupling agent.

2. The binder composition of claim 1, wherein the glass transition temperature (Tg) of the binder polymer is in a range of −20° C. to 20° C.

3. The binder composition of claim 1, further comprising nanoparticles that are inorganic particles.

4. The binder composition of claim 3, wherein the inorganic particles comprise one or more selected from the group consisting of silica, alumina, titania and zirconia.

5. The binder composition of claim 1, wherein the silane coupling agent includes one or more selected from the group consisting of alkoxy, halogen, amino, vinyl, glycydoxy and hydroxyl groups.

6. The binder composition of claim 3, wherein the inorganic particles comprise one or more selected from the group consisting of metal oxides and metalloid oxides.

7. The binder composition of claim 1, wherein the binder polymer is a styrene-butadiene rubber based polymer.

8. An electrode for a rechargeable battery, comprising:
   an electrode active material; and
   the binder composition of claim 1.

9. The electrode of claim 8, wherein the electrode active material comprises one or more active materials selected from the group consisting of a Si-based active material, an Sn-based active material, oxides thereof, and alloys thereof.

10. The electrode of claim 8, wherein the electrode is a negative electrode.

11. A rechargeable battery comprising:
    a positive electrode;
    a negative electrode; and
    an electrolytic solution,
    wherein the positive electrode or the negative electrode is the electrode of claim 8.

12. The rechargeable battery of claim 11, wherein the glass transition temperature (Tg) of the binder polymer is in a range of −20° C. to 20° C.

13. The rechargeable battery of claim 11, further comprising nanoparticles that are inorganic particles.

14. The rechargeable battery of claim 13, wherein the inorganic particles comprise one or more selected from the group consisting of metal oxides and metalloid oxides.

15. The rechargeable battery of claim 11, wherein the binder polymer is a styrene-butadiene rubber based polymer.

16. The rechargeable battery of claim 11, wherein the electrode is the negative electrode.

17. A rechargeable battery binder composition, comprising:
    one or more nanoparticles having an average particle diameter of 10 nm to 100nm, and a binder polymer having a glass transition temperature (Tg) of 20° C. or less,
wherein the rechargeable battery binder composition has a storage modulus (60° C.) of 50-150 MPa, and
wherein the nanoparticles comprise organic particles utilized as a coupling agent between the nanoparticles and binder polymer.

* * * * *